United States Patent [19]
Hawley

[11] 4,153,381
[45] May 8, 1979

[54] SHOCK ABSORBING APPARATUS FOR HOISTING UNDERWATER PIPELINE
[75] Inventor: Royal T. Hawley, Everett, Wash.
[73] Assignee: Western Gear Corporation, Everett, Wash.
[21] Appl. No.: 830,778
[22] Filed: Aug. 31, 1977
[51] Int. Cl.² .............................................. F16L 1/04
[52] U.S. Cl. ................. 405/173; 294/66 R; 405/158
[58] Field of Search ................ 61/105, 107, 108, 110, 61/111, 114; 166/0.5, 0.6; 188/314; 267/64 R; 294/66 R, 88

[56] References Cited
U.S. PATENT DOCUMENTS

| | | | |
|---|---|---|---|
| 2,495,516 | 1/1950 | Foster | 267/64 R |
| 2,981,074 | 4/1961 | Wilder | 61/107 X |
| 3,319,426 | 5/1967 | Slonczewski | 61/114 |
| 3,525,226 | 8/1970 | McCarron | 61/114 X |

Primary Examiner—Mervin Stein
Assistant Examiner—David H. Corbin
Attorney, Agent, or Firm—Seed, Berry, Vernon & Baynham

[57] ABSTRACT

A pipe laying vessel has a hoisting winch whose cable is connected to an underwater pipeline during abandonment and recovering operations by a shock absorbing device inserted into and connected to the free end of the pipeline. The shock absorbing device includes a pre-pressurized hydraulic accumulator which is hydraulically coupled to a cylinder and piston, the piston being connected to the hoisting cable with shock loading due to wave action on the vessel being converted to movement of the piston in the cylinder and against pressure of the accumulator.

3 Claims, 1 Drawing Figure

SHOCK ABSORBING APPARATUS FOR HOISTING UNDERWATER PIPELINE

BACKGROUND OF THE INVENTION

1. Field of the Invention

This invention pertains to pipeline abandonment systems for pipelaying vessels and, more particularly, to shock absorption apparatus for such pipe abandonment systems.

2. Description of the Prior Art

In the course of laying a pipeline on the floor of a body of water such as an ocean the wave action can become so severe that there is danger of injury or damage to the personnel, equipment or the pipeline itself. In heavy seas the free end of the pipeline is plugged and the pipeline is removed from the tensioning apparatus on the vessel and lowered to the ocean floor. It is critical that the pipeline be lowered and raised gently to and from the ocean floor so that it will not be damaged due to shock loading caused by wave action on the vessel. One technique for reducing the shock loading is taught in U.S. Pat. No. 3,991,584 in which a shock-absorbing sheave assembly is mounted on the vessel and the abandonment cable passed over the sheave. This sheave assembly is effective in minimizing normal shock loading but has not adequately handled greater fluctuations of wave action beyond those normally encountered. In addition, on some vessels it is difficult to find room for additional shock absorbing mechanisms to handle these abnormally large wave fluctuations.

SUMMARY OF THE INVENTION

It is an object of this invention to provide the shock-absorbing device for pipeline abandonment hoisting systems in which the shock-absorbing device is coupled directly between the cable and the free end of the pipeline.

It is still another object of this invention to provide a relatively inexpensive shock-absorbing device which can be inserted into and connected to the end of an abandoned pipeline.

Basically these objects are obtained by providing in a pipeline abandonment system an accumulator which can be pre-pressurized and secured within the end of the pipeline. Coupled to this accumulator is a motion transmitting member such as a cylinder and piston with the piston having one end coupled to the hoisting cable and transmitting shock movement of the cable to the fluid of the accumulator to dissipate the shock loading.

As is readily apparent, this type of shock-absorbing device can be easily stored on the vessel and inserted into the pipeline just prior to abandonment. It can be easily welded into place and cut free when the pipeline is recovered. The device does not require storage space on the deck of the vessel, is simple in operation and easy to maintain, and is sealed from the corrosive salt water by being located within the pipeline.

BRIEF DESCRIPTION OF THE FIGURE OF THE DRAWING

The drawing illustrates a schematic sectional view of a shock absorbing device embodying the principles of the invention as used in a pipe abandonment system.

DETAILED DESCRIPTION OF THE PREFERRED EMBODIMENT

Figure 1:
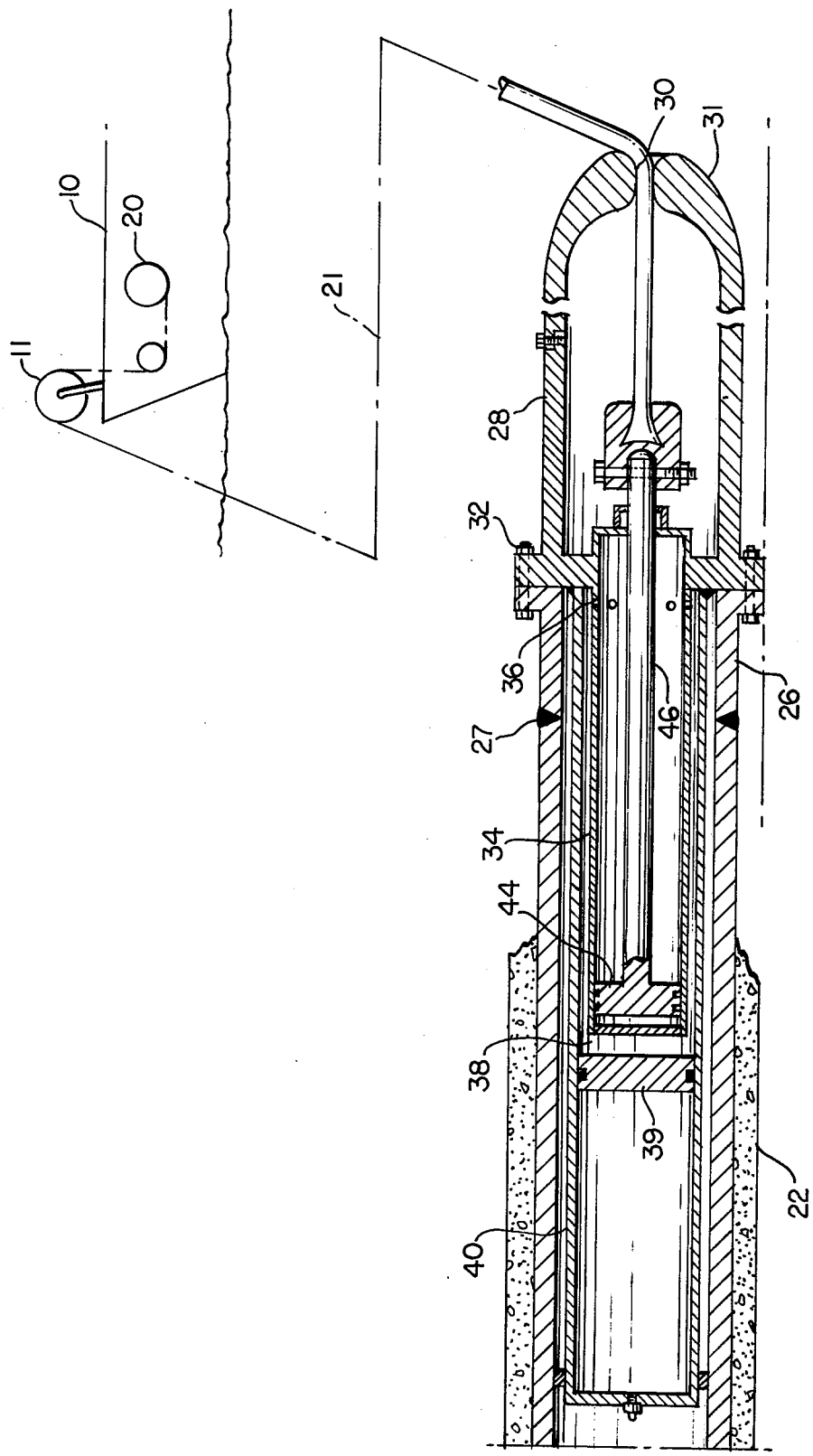

A vessel 10 is provided with a sheave 11 which may be of a shock absorbing type sheave as shown in U.S. Pat. No. 3,991,584 and a winch 20. The winch is provided with a cable 21 that passes over the sheave 11 and is coupled at its lower end to the free end of the pipeline 22 which is being moved to or from the ocean floor.

The pipeline free end is connected to an adapter flange 26 by weldments 27 while the pipeline is in the tensioner on board the vessel. A guide plug 28 having a ferrule 31 and passage 30 will have been previously secured to the adapter flange as by bolts 32. The guide plug includes a cylinder 34 having a plurality of discharge ports 36 that are exposed within an accumulator chamber 38. Preferably the accumulator chamber 38 is filled with oil and is pressurized by a movable piston 39 that rides in an accumulator cylinder 40. The accumulator cylinder 40 is pre-pressurized with gas which pressure then is transmitted to the oil in the chamber 38.

Mounted within the cylinder 34 is a piston 44 having a piston rod 46 that is coupled to the cable 21. The piston rod stroke is within the guide plug 30 and in alignment with the passage 30 so that the pull from the cable 21 will be transmitted coaxially of the piston rod regardless of the position of the cable 21.

In operation the adapter flange is bolted to the guide travel plug complete with its pre-pressurized accumulator, piston and cylinder 44 and 34, and cable 30 and the entire assembly is inserted into the end of the pipeline and welded in place while in the pipeline tensioner. The winch then takes control of the lowering of the pipeline. Generally the winch will be a constant tension winch for maintaining a relatively constant tension on the pipeline with the more rapid and severe fluctuations being absorbed by movement of the piston 44 within the cylinder 34 which movement is transmitted into forcing fluid into the accumulator chamber 38 to dissipate any shock loading.

While the preferred embodiment of the invention has been illustrated and described it should be understood that variations will be apparent to one skilled in the art without departing from the principles herein. Accordingly the invention is not to be limited to the specific embodiment illustrated in the drawing.

I claim:

1. A pipeline hoisting system for abandoning and recovering elongated pipelines connected by a cable to a vessel from the floor of a body of water having wave motion which causes load shocks, comprising:

coupling means adapted to be welded to the free end of the pipeline while on the vessel, and shock absorption means secured to and within said coupling means and adapted to be fastened to said cable whereby wave load shocks when lowering or raising the pipeline are absorbed by said shock absorption means at the pipeline, said shock absorption means including a prepressurized pneumatic-fluid accumulator, a piston and cylinder in communication with said accumulator for passing fluid to and from the accumulator in response to movement of said piston, said piston being adapted to be coupled to said cable for transferring motion of the vessel to movement of the piston and thereby absorb the load shocks on the pipeline.

2. The pipeline hoisting system of claim 1, said prepressurized accumulator extending into and supported within the free end of the pipeline said cylinder extending into the accumulator, and a guide plug fastened to the coupling means for directing the force of the cable coaxially of the piston means.

3. The system of claim 1, said coupling means including an adapter flange welded to the free end of the pipeline.

* * * * *